United States Patent [19]
Sullivan et al.

[11] 4,135,395
[45] Jan. 23, 1979

[54] UNDERSEA MINING INSTRUMENT

[75] Inventors: Arthur F. Sullivan, Redmond; William E. Currie, Seattle, both of Wash.

[73] Assignee: The International Nickel Company, Inc., New York, N.Y.

[21] Appl. No.: 845,548

[22] Filed: Oct. 26, 1977

[51] Int. Cl.² .............................................. G01F 1/28
[52] U.S. Cl. ................................................. 73/194 B
[58] Field of Search .................. 73/228, 194 B, 43 L, 73/43 PS

[56] References Cited
U.S. PATENT DOCUMENTS

| | | | |
|---|---|---|---|
| 2,571,863 | 10/1951 | Godsey | 73/228 |
| 3,640,136 | 2/1972 | Nolte | 73/228 |
| 3,715,920 | 2/1973 | Groberman et al. | 73/194 B |
| 3,816,773 | 6/1974 | Baldwin et al. | 73/194 B |
| 3,860,481 | 1/1975 | Gopal et al. | 176/19 R |
| 3,939,709 | 2/1976 | Echtler | 73/228 |

Primary Examiner—Anthony V. Ciarlante
Attorney, Agent, or Firm—Ewan C. MacQueen

[57] ABSTRACT

Electromechanical impact meter enables obtaining real-time on-site collection rate information concerning undersea mining of manganese nodules or other solid minerals at a remote location.

10 Claims, 9 Drawing Figures

STREAM FLOW

STREAM FLOW

STREAM FLOW

STREAM FLOW

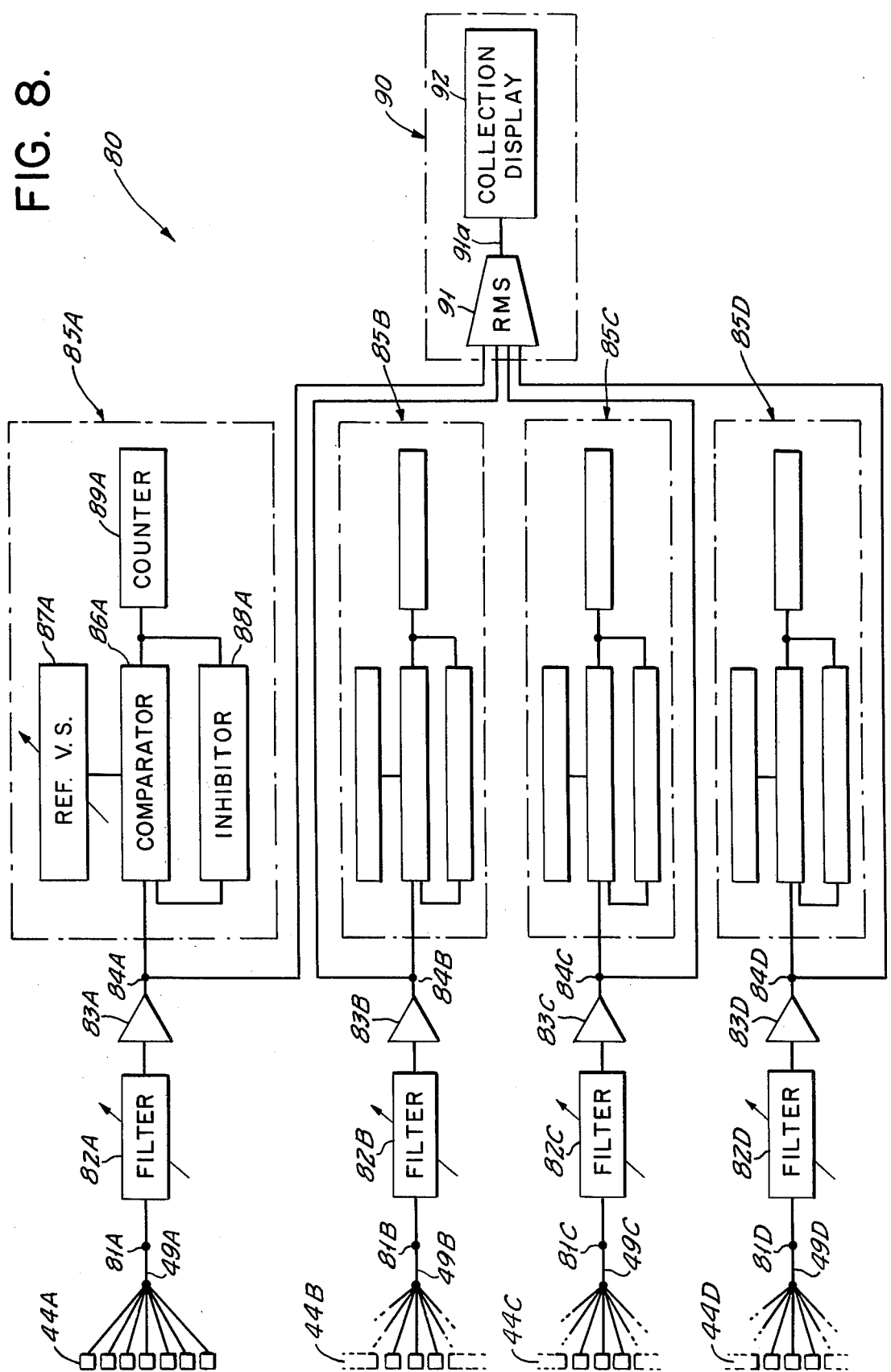

UNDERSEA MINING INSTRUMENT

The present invention relates to measuring flow rates and more particularly to the measurement of rate of flow of solid materials entrained in fluid moving through a conduit.

Heretofore, methods and apparatus have been devised for transporting solid material in a stream of fluid flowing in a conduit, e.g., a pipeline. In some instances it can be important to know the amount of solid material being carried in a fluid stream. Special problems occur when the place where the solids enter the stream is remote from human access and solids content information is needed quickly on a real-time basis without waiting for the solids to move to the stream delivery location. For instance, for undersea mining of manganese nodules it is important to obtain real-time information about the rate of collection of nodules at the mining site in order to have information for, inter alia, judging the efficiency of collection, learning the relative abundance of nodules at the mining site, or for making operational decisions such as whether to change speed or direction of towing a collector or whether to change the rate of suction pumping through a conduit. And, for testing and comparing capabilities of collection apparatus and yet avoiding necessity of transporting test quantities of collected material up to the sea surface for measurement, it is highly beneficial to obtain real-time on-site collection rate information.

There has now been discovered an apparatus for rapidly learning the amount of solid material being put through a fluid flow conduit at a remote location.

It is an object of the present invention to provide apparatus for metering solid materials moving in a fluid stream.

Another object is to provide a process for metering the flow of solid materials in fluid flow through a conduit.

Other objects and benefits of the invention will be apparent from the following description and drawing wherein:

FIG. 8 is a block diagram of electric circuitry for processing electric signals from sensors in instruments of the invention.

Figure 1:
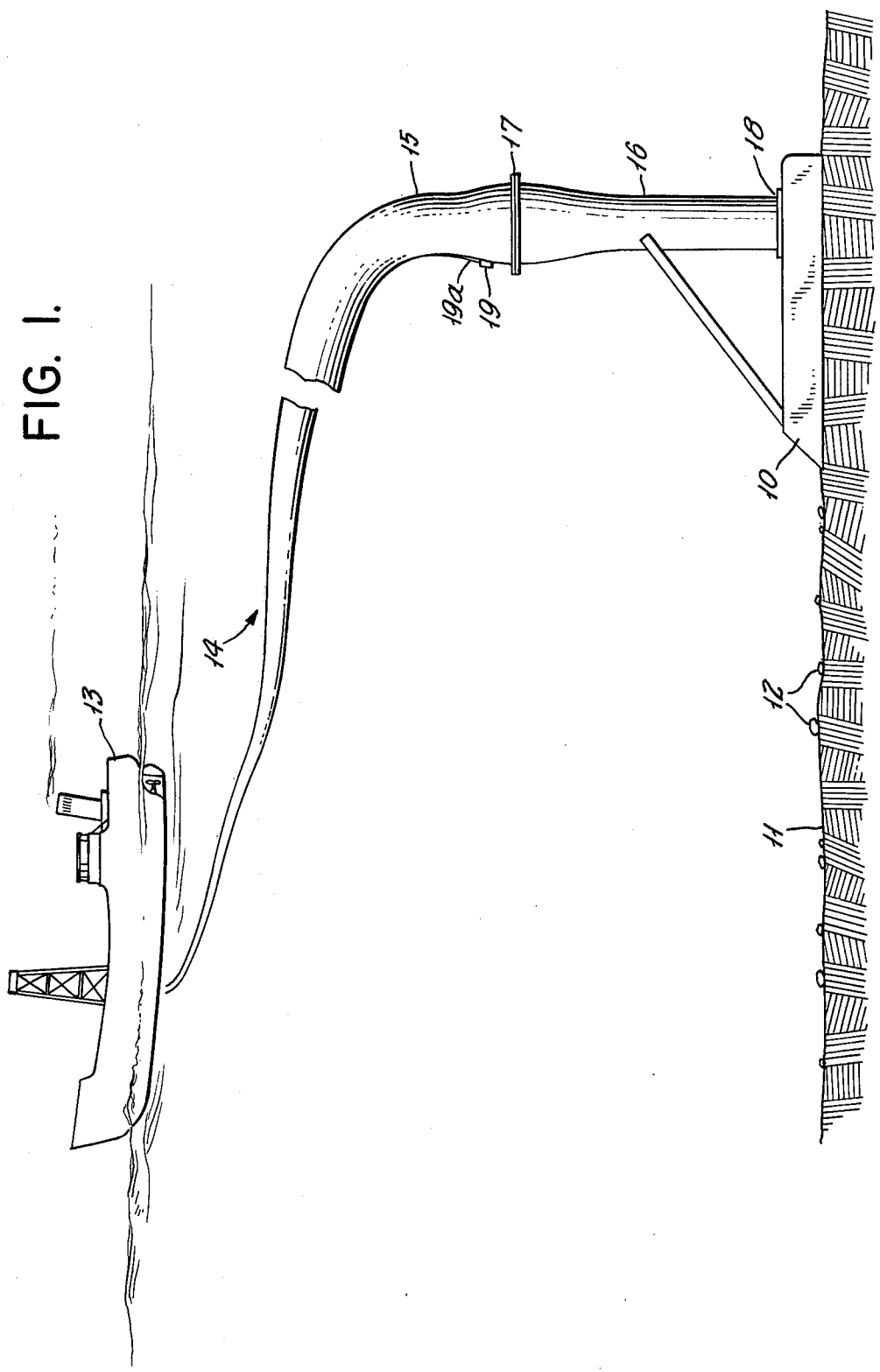
FIG. 1 illustrates deployment of the invention in an undersea mining environment.

The present invention particularly contemplates measurement of the output of manganese nodules or other solid materials from an undersea mining collector with impact meter apparatus having a target and electromechanical sensor combined in a fluid flow conduit leading from the delivery exit of the collector. In the conduit, the target is disposed transversely to the fluid flow and the sensor is mounted to generate a voltage pulse response to a mechanical impact upon the target by an object moving in the direction of the fluid flow through the conduit. (Responsiveness to excessively transverse, e.g., greater than 45°, impacts or vibrations on the target or conduit would be undesirable and lead to deleterious noise.) Electronic circuitry in communication with the sensor provides digital and analogue signaling, or at least one thereof, that is informative of the quantity of solids (solid materials) delivered into the conduit from the collector.

Advantageously, the circuitry includes components to amplify nodule impact responses and inhibit spurious responses and other noise. For another advantage, the apparatus has components adapted for providing a distinctive measurement of the quantity of any sediment or other undesired fine material that the collector picks-up and emits into the conduit.

Additionally, the apparatus can be made to indicate presence of unusually heavy lumps of material in the conduit flow, although the conduit or the mining collector will usually be screened or barred to prevent passing detrimentally massive solids, e.g., large rocks, that might damage the metering apparatus or other equipment receiving the liquid-solid flow from the collector.

The apparatus provides electric signaling of the amount of solid material that is put through a conduit from the mining collector during a specified interval of time (the solids throughput). The apparatus signaling is calibrated for solids throughput with measured quantities of solids in a fluid stream that is flowing, in a conduit containing the target, at a velocity in the range of intended use, the solids content being measured (before or after) for mass and, if desired, additional possibly useful information, e.g., size and count. Inasmuch as the apparatus is responsive in a manner that is calibrateable to the amount of solids entrained in the conduit stream, particulars as to the proportion of the solids that actually impact upon the target, or make multiple impacts, or miss the target, or whether the sensor response is theoretically proportional to kinetic energy ($MV^2$) or momentum ($MV$), are unnecessary for practical use of invention.

For digital signaling, sensor signals having the frequencies and strengths characteristic of nodule impacts can be isolated with electrical filtering and threshold screening components and converted to a stream of digital pulses, each pulse representing an impact of at least a threshold level, that are informative of the number of nodules passing through the conduit.

For analogue signaling electric responses from the impact sensor are fed through circuitry providing a time-varying voltage signal that varies according to the total mass of solids impacting onto the target in a unit period of time, for instance, an electrodepositing coulometer or a voltage integrating circuit. Also, the signal can be spectrally analyzed to determine the power spectral density and discern relatively high frequency impacts, characteristic of nodule impacts, versus relatively low frequency impacts, characteristic of sediment clump impacts.

Analogue signal outputs and digital signal outputs from the apparatus can be read on digital counters, or strip charters or stored for future reference. Ratios of collection are obtained by correlating the information with time intervals.

The manganese nodules that are of special interest in carrying the invention into practice are, approximately, 0.01 to 0.2 pounds each in weight and 0.25 to 2.5-inch in minimum dimension, minimum dimension being understood as the smallest diameter aperture permitting passage of the nodule. Yet, the apparatus can be adapted, e.g., by changing filters or adjusting threshold voltages, to meter the flow of other kinds of solid minerals or other solids that have a mass as low as about 0.001 pound and can be entrained in a fluid stream. Undesirably fine materials (fines) are of sizes up to 1/64-inch.

Commercially available kinds of electromechanical transducers, e.g., inertial-mass accelerometers or piezoelectric crystal transducers, are suitable for sensing desired impacts on the target. The mountings of the sensors are arranged, e.g., by orientation or structure, to promote generating major electrical responses from impacts by solid articles moving in forward directions parallel to the upstream conduit flow. For instance, linear inertial-mass accelerometers are mounted parallel to the conduit flow, and mountings for piezoelectric crystals are arranged to provide greater structural shielding at back and side surfaces than at the front faces. Also, the mounting arrangements should be adapted to avoid or inhibit generation of excessive resonance response.

As sensors, inertial accelerometers are deemed advantageous for obtaining major response to flow-line directed impacts, and piezoelectric crystals are advantageous for overcoming resonance difficulties and for obtaining impact distribution information.

The target can be various shapes, e.g., circular rectangular or ovular, flat or curved, concave or convex, and, where desired, can have apertures for flow of water and/or solids, or be made of or comprise stiff screen, or comprise an array of target segments joined in a framework. The exterior of the target and the interior of the surrounding conduit are correlated to enable a smooth high-rate flow of water through the conduit at the location of the target. In this regard, when the target is of continuous sheet form, such as a flat or curved plate, the target and conduit arrangement desirably provides a passage therebetween with a cross-sectional area between the plate and conduit equal to the upstream cross-sectional area of the conduit portion leading from collector to the target. And the target presents sufficient area transverse to the conduit flow to enable obtaining impact from a high proportion of the nodules that flow through the conduit. Orientation of the target, in whole or in part, can be perpendicular or angularly transverse, advantageously at least sixty degrees, to the line of conduit flow. Desirably, for instance with plate-like targets, the transverse area equals the upstream conduit area and the passage area also equals the upstream conduit area, e.g., the plate is a circle of the same diameter as that of the upstream conduit and, at the plate location, the interior of the enlarged section of the conduit is a circle of a diameter about 1.4 times the plate diameter. Additional important needs are for the target to be of a structure that avoids or inhibits conditions conducive to repetitive impacts by the same piece of solid matter, such as in turbulent flow conditions at the upstream face, and inhibits detrimental resonance or ringing that would merge or blur responses to individual impacts. Best results have been obtained with a piezoelectric responsive target having piezoelectric crystals attached to mutually parallel target bars disposed in a fence-like arrangement.

Turning now to the drawing, FIG. 1 illustrates undersea mining apparatus using an embodiment of the invention for on-site measurement of collection rate. Mineral collector 10 is adapted for being towed along undersea floorline 11 in order to collect minerals, such as manganese nodules 12. Towing power is provided by ship 13 pulling conduit 14, comprising riser pipe 15 joined to collection acceptor tube 16 at junction flange 17, with tube 16 braced and mounted on delivery exit 18 of collector 10. The ship also provides power for pumping a flow of water and solids up from the collector to the ship via the conduit. Flow of solids in the conduit is metered by an embodiment of the invention enclosed within the conduit, for instance, at the location of the junction flange. Electric signals from the metering instrument are transmitted from junction box 19 through cable 19a to the ship. The mining collectors that the invention serves to meter can be of kinds known or contemplated, presently or in futuro, for obtaining solid minerals from the undersea floor and delivering mixtures of solids and fluids through a collection delivery exit that can be connected to fluid flow conduit. And it is to be understood that one of the benefits of the invention is capability for comparing operational performances of various prototypes of undersea mining collectors. If, as in prototype testing, it is desired to test collection performance without having a suction riser to a surface ship, fluid flow through a test conduit can be provided with an undersea motor-impeller combination.

Collection acceptance tube 16, which is mounted on the collector, provides for having a straight flow stream at the measuring instrument and for avoiding local swirls and turbulence that might detrimentally affect the desired measurements. In some instances, the tube may be as long as 100 diameters. If desired, the tube can have internal guides, vanes or baffles to benefit straight-line flow to the meter.

Figure 2:
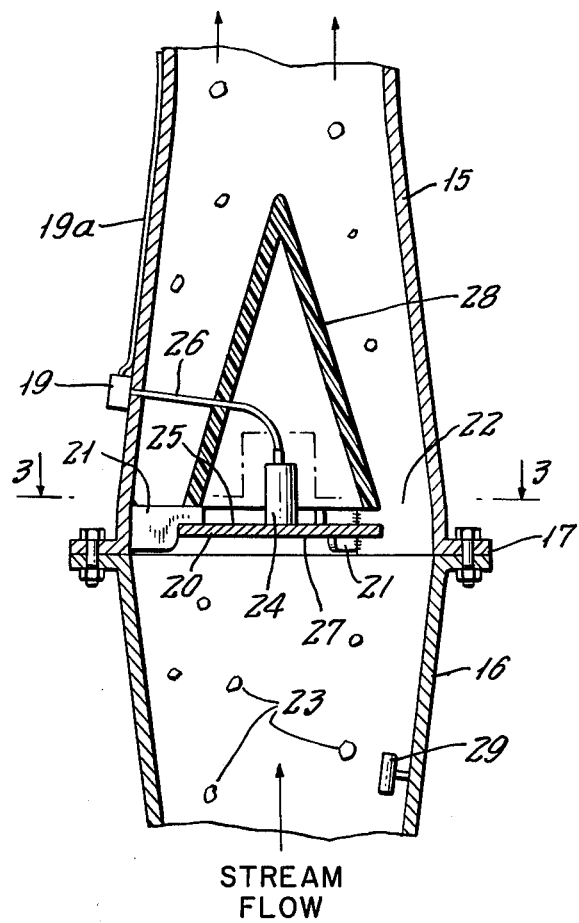
FIG. 2 is a side view, on an enlarged scale, of a portion of a vertical section through the vertical center-line (the horizontal sections being generally annular) of conduit 14 shown on FIG. 1 and depicting an accelerometer sensing embodiment of the invention.
Figure 3:
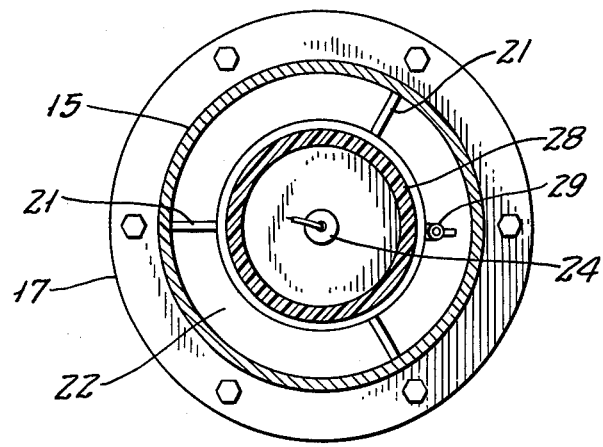
FIG. 3 is a top view from a horizontal section through line 3—3 on FIG. 2.

FIG. 2 shows an enlarged vertical-section view of riser pipe 15 and acceptor tube 16, taken on a vertical plane through flange 17 shown on FIG. 1, of an embodiment having target plate 20 held by supports 21 near the junction of the pipe and tube. FIG. 3 shows a downward view from a horizontal section through line 3—3 above target plate 20, which has the structure of a metal disc. The supports and plate are arranged to provide passages 22 for upward flow of water and water-borne solids, including nodules 23, from the mining collector. Inertial-mass accelerometer 24 is mounted on the target plate at the center of downstream face 25 and is in communication with the pipe exterior via insulated electrical lead wire 26 passing through the pipe wall and joined to junction box 19. Upstream face 27 is exposed to nodule flow impacts. Cone 28 is mounted downstream of (at the backside and vertically above) the plate so as to streamline the flow behind the plate. Water velocity meter 29, if desired, enables obtaining fluid flow information.

Figure 4:
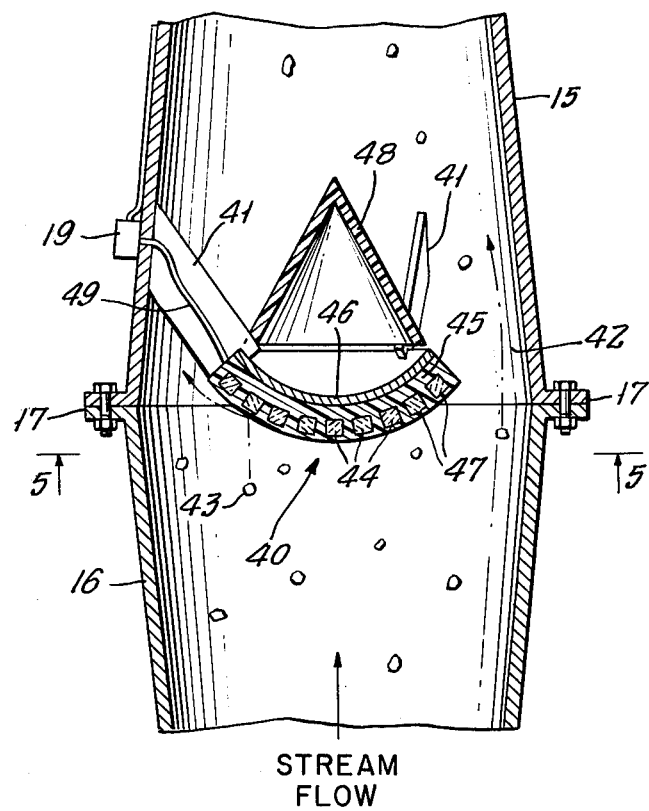
FIG. 4 is a side view, on an enlarged scale, of a portion of a vertical section through the centerline of conduit 14 shown on FIG. 1 and depicting a piezoelectric sensing embodiment of the invention.

For illustration of practice with a piezoelectric responsive embodiment, FIG. 4 shows a vertical sectional view, on an enlarged scale, of riser pipe 15 and acceptor tube 16 having a piezoelectric responsive embodiment, designated generally by arrow 40, held by supports 41 near pipe-tube junction 17. In use, water and waterbourne solids flow upward through passages 42 and in many instances, e.g., bouncing nodule 43, cause an impact response while on the way through the conduit. Transducer-target component 40 has piezoelectric transducers 44 embedded in flexible plastic matrix 45 bonded to metal backing plate 46. For example, the transducers are barium titanate crystals embedded in a polyurethane plastic matrix that is bonded to a steel backing plate. A thin, e.g., ⅛-inch, layer of the material of matrix 45 provides a protective cover over front surfaces 47 which serve as target faces. Cone 48, above and downstream of plate 46, aids streamlining the flow in the conduit. Electric responses from the transducers are transmitted through multiple-lead conductor 49 to junction box 19.

Figure 5:
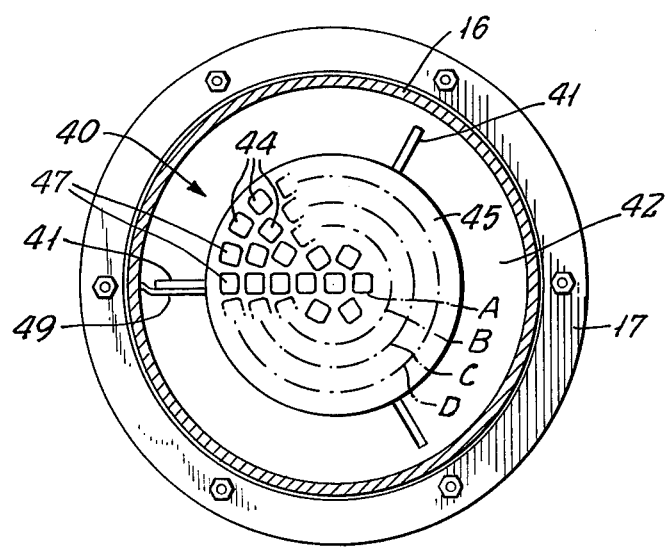
FIG. 5 is an upward view from a horizontal section through line 5—5 on FIG. 4.

FIG. 5 shows an upward view within the conduit from a horizontal plane through line 5—5 on FIG. 4. For illustration of the transducers, transducer faces 47 are shown behind the covering of matrix 45. It is to be noted that on FIG. 5 the transducers (44) are referred to by letters identifying annular groups A, B, C and D. The transducers of each group are wired together with branch leads (not shown) connected in electrical parallel with each other to a trunk lead for the group. The lead for each transducer group, e.g., a trunk lead 49A from the seven transducers 44A (the center transducer being included in group A), communicates to one of the group signal leads shown on the subsequently referred to FIG. 8.

Figure 6:
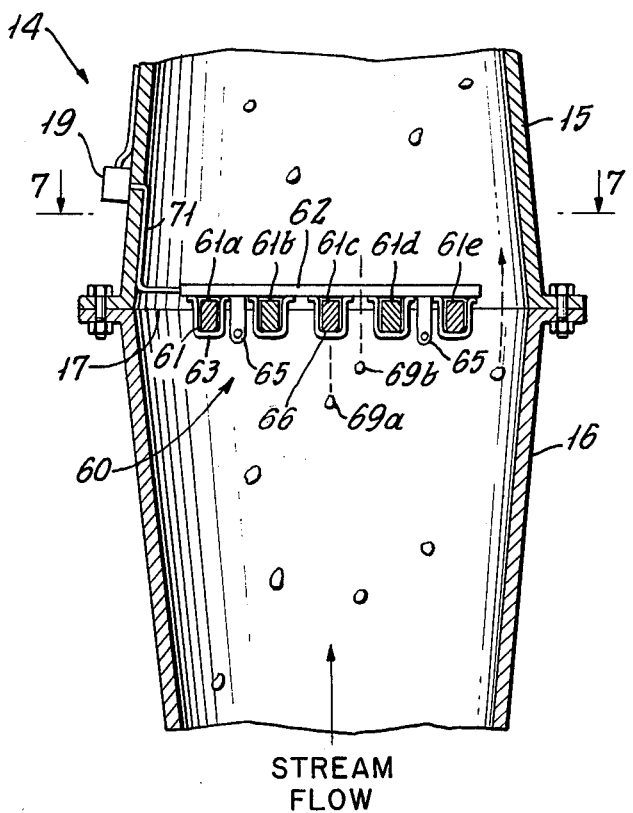
FIG. 6 is a side view, on an enlarged scale, of a portion of a vertical section through the centerline of conduit 14 shown on FIG. 1 and depicting a multiple rod piezoelectric sensing embodiment of the invention.
Figure 7:
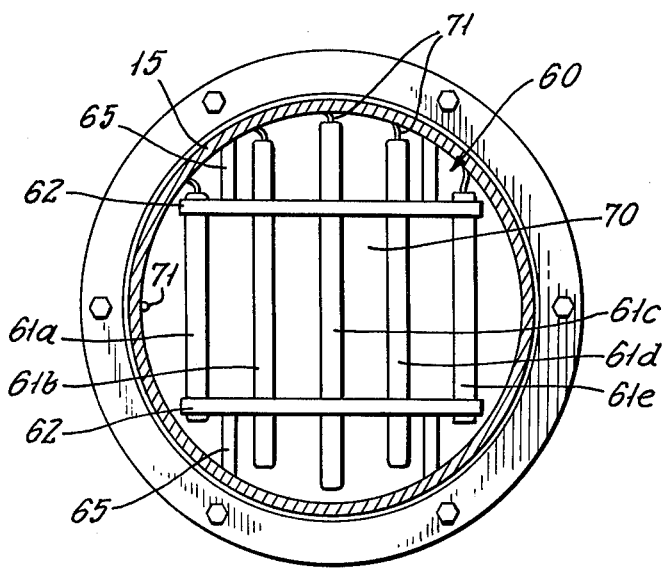
FIG. 7 is a top view from a horizontal section through line 7—7 on FIG. 6.
Figure 6A:
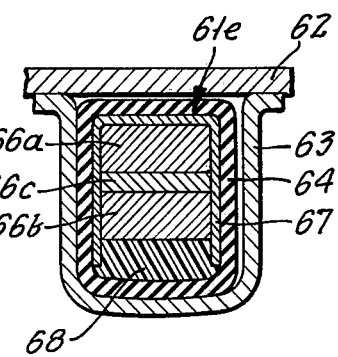
FIG. 6A illustrates a portional enlargement of FIG. 6.

FIGS. 6, 6A and 7 refer to an advantageous fencelike embodiment, designated generally by arrow 60, having piezoelectric crystal-carrying target rods disposed mutually parallel and perpendicularly transverse to fluid-solids flow in a conduit such as conduit 14 of FIG. 1. Target rods 61 (61a, 61b, 61c, 61d and 61e) are held loosely to frame bars 62 by straps 63, the holding of the rods being sufficiently loose to avoid resonance with other structural components. Advantageously, cushions 64, e.g., rubber padding, are provided to inhibit rattle impact noise. Brackets 65, attached to tube 16, support the frame in the widened portion of the conduit at about the level of the pipe-tube junction 17. The target rods 61 each have a piezoelectric crystal transducer 66 with a metal casing 67 at back and side surfaces and a plastic facing 68 at the front. Advantageously, to enhance frontal impact signal strength, each transducer 66 comprises two crystal portions 66a and 66b and a quarter-wave coupling 66c, referred to in enlarged view FIG. 6A. When in use with nodule collecting apparatus, target rods 61 are impacted by a portion of the collected nodules, e.g., nodule 69a, while another portion, e.g., nodule 69b, pass through passages 70 in the target fence. Impact signals are transmitted from transducers 66 through target rod leads 71, which are individually insulated and communicate, via junction box 19, to group signal leads for a signaling circuit such as is referred to in conjunction with FIG. 8 herein.

FIG. 8 shows a block diagram of a digital and analogue signaling circuit, designated generally by arrow 80, for processing electric responses from the impact sensor(s) and impact surface(s) of the target in a nodule metering instrument of the invention. Circuit 80 is generally suitable for use with accelerometer piezoelectric embodiments and, in FIG. 8, is exemplified as having transducer group output leads 49A, 49B, 49C and 49D (from transducers 44A, B, C and D referred to on FIG. 5), connected to circuit input posts 81A, 81B, 81C and 81D, respectively. The group signals are fed through corresponding filters (82A, B, C and D) and isolation amplifiers (83A, B, C and D) to channel input forks 84A, B, C and D, where each group signal goes to a corresponding digital channel, designated generally by arrows 85A, 85B, 85C and 85D, and also to the common summation analogue channel designated by arrow 90.

Each digital channel comprises a comparator circuit (86), a reference voltage source (87) and an inhibitor circuit (88) associated to operate with the comparator, and a digital counter (89) connected to receive signals from the comparator. In each digital channel, the comparator puts out a short-duration one-shot pulse upon receipt of an input signal above a chosen threshold level, and serves to block or restrict low impact responses and other noise. The inhibitor briefly shuts-off the comparator output after each pulse, and thus aids to provide one-count per event capability and prevent or substantially inhibit excess multiple counts that might occur from structural ringing following an impact on the target. The short-duration of the comparator output pulse can be set in the 1–100 microsecond order and the inhibitor shut-off set for about 1–10 millisenconds, adjustment being made with the understanding that the signals generally are of sharply rising nonsinusoidal forms.

Analogue channel 90 has isolation and RMS summation circuit 91 and integrated collection display instrument 92. The RMS circuit is connected to receive and combine signals emanating from transducer groups A, B, C and D, and to transmit onto lead 91a a direct-current voltage signal that is a function of, and varies according to, the actual, or "true" (whatever the wave form), root-mean-square value of the combined electrical responses of the impact sensors. Accordingly, the output signal from RMS circuit 91 is a unidirectional signal having a magnitude that varies dependently on the sum of the direct-current components in the transducer impact signals, and thus provides a measure of the total weight that is currently impacting onto the target transducers. The collection display has means for accumulating and displaying impact signal information arriving during chosen time intervals, e.g., a microcoulometer or an integration circuit.

Counter and display components comprise digital readers, strip chart recorders, tape recorders and storage banks according to need for use of the information from the impact target.

Portions, or all, of the circuitry can be disposed undersea or abroad ship, as desired, with communications cables and telemetry according to the distances involved. Electric power needed at the undersea site can be from a rechargeable battery or directly from a cable connected to a surface ship. Impact sensor outputs can be conditioned, e.g., preamplified, to match the sensor output to the signal processing circuit and amplifiers can be fixed or variable-gain types. Signal filtering and amplification, target resonance characteristics and sensor output characteristics are correlated to benefit obtaining impact signals that are distinctly perceivable, and thus countable, and to avoid having the impact responses merged or obscured by resonance, or ringing, of the target or by water shock waves or other undesired noise. Thus, vibration isolation or damping of the target may be desirable or highly important according to the operational environment of the instrument. The impacts of pertinent interest for nodule metering can generate wave forms having characteristics of signals oscillating at frequencies up to 10,000 hertz, or higher, inasmuch as the impact signals often are steeply sloped even though the impacts may occur much less often than 10,000 per second, and may be only one or less per second. Filtering cut-offs of frequencies above 100 Hz are desirable to help isolation of desired impact information signals.

Differently from impacts by nodules, clods or lumps of softly packed slit or other sediment can hit the target with a plastic-like mushy blow, sounding like a dull thud, resulting in very low frequency wave forms, such as 5 Hz or lesser sine wave forms. Accordingly, analysis of low frequency components of the sensor signal output can be informative of the sediment content of the material being conveyed from the collector.

For the purpose of giving those skilled in the art a better understanding of the invention, the following illustrative example is given:

A circular target 6 inches in diameter by ½-inch thick and made of stainless steel is disposed perpendicularly across the axis of a fluid conduit having a diameter of approximately 0.7 feet at an upstream inlet from the conduit. The conduit is enlarged around the target to provide a passage space, in conjunction with the target, of about 0.9 square feet. An inertial-mass accelerometer sensor is mounted on the back (downstream) face of the target and feeds signals to a digital counter channel and an electric analogue channel through circuitry comprising components for filtering, amplification and metering as referred to in conjunction with FIG. 8 herein. A flow of water is established at a chosen velocity through the conduit and a known quantity of measured manganese nodules is introduced into the flow downstream of the target. The target is impacted by nodules introduced with the preselected nodule quantity and electric signals are generated by the impacts of the nodules onto the target. Electric signals from the digital counter channel and the analogue channel, and the time interval, are recorded and the information is entered on a calibration chart. Thereafter, the conduit portion having the target and sensor therein is connected to the collection and the collector is lowered into the sea and moved, in mineral collecting operation, along an undersea floor area containing manganese nodules. Meanwhile the electromechanical sensor on the target and the electric circuitry joined thereto are electrically energized. Electric signal outputs at the digital counter channel terminal and the analogue channel terminal are telemetered to a surface ship which is towing the collector. The signals arriving from the digital and analogue channel terminals are read and compared with the signal information previously obtained for calibration and, in view of said comparison, the solids throughput in the conduit attached to the collector, and thus the collection performance of the collector, is made evident.

The present invention is particularly applicable for quantitatively metering the flow rate of manganese nodules entrained in a water-plus-solids stream flowing in a conduit from the collection delivery exit of an undersea mining collector. The invention is also applicable for metering conduit flow of other solids, e.g., phosphate accretions of similar mass and size. Moreover, the invention is also applicable to obtaining information concerning the fluid-flow throughput of various sizes of solid articles having suitable mass characteristics, e.g., 0.001 to about 0.5 pound weight, or possibly heavier for generating practically measurable electric responses from an electromechanical impact transducer on a target in a fluid flow conduit, providing of course the article has resilient nonadherent characteristics sufficient for rebounding (or other departing) after impact without excess accumulation on the target.

Although the present invention has been described in conjunction with preferred embodiments, it is to be resorted to without departing from the spirit and scope of the invention, as those skilled in the art will readily understand. Such modifications and variations are considered to be within the purview and scope of the invention and the appended claims.

We claim:

1. Apparatus for metering the flow of solid articles entrained in a moving fluid-solids mixture comprising:
    (a) a conduit having a fluid-impermeable interior wall for enclosing a fluid-solid flow of a mixture of fluid and solid articles moving in a forward direction when proceeding from the conduit entrance to the conduit exit;
    (b) a target supported inside the conduit and disposed with a surface of the target transversely facing the forward direction of fluid-solids flow in the conduit and arranged, in correlation with the interior wall of the conduit, to receive mechanical impacts by solid minerals in fluid-solids flow moving forwardly in the conduit and to provide passage space for continual flow of fluid and solids through the conduit;
    (c) an electromechanical impact sensor joined to the target in an arrangement for generating a voltage pulse signal of major magnitude when mechanically impacted by a solid article moving in a direction parallel to the forward flow direction, said signal of major magnitude being characterized by a peak voltage greater than would result from impact by the same solid article moving at an angle transverse to the forward direction; and
    (d) electric circuit means for receiving electric signals from the sensor and providing, in response thereto, a digital output signal informative of the number of solid articles that impact upon the target at a chosen moment or during a preselected time interval.

2. Apparatus as set forth in claim 1 wherein the impact sensor includes an inertial mass accelerometer.

3. Apparatus as set forth in claim 1 wherein the impact sensor includes a piezoelectric crystal.

4. Apparatus as set forth in claim 1 wherein the target comprises a plurality of rods spaced apart from each other and each rod has a piezoelectric crystal sensor attached individually to the rod.

5. In combination with an undersea mining collector having means for collecting solid minerals from the undersea floor and for transmitting, as a water-solids flow, a mixture of the collected minerals and sea water through a collector delivery exit, the improvement comprising:
    (a) a conduit having an entrance connected to receive water-solids flow from the collector delivery exit, said conduit also having an exit remote from the entrance and a water-impermeable interior wall for enclosing a water-solids flow that moves in the forward direction when proceeding from the entrance to the exit of the conduit;
    (b) a target supported inside the conduit and disposed with a surface of the target transversely facing the forward direction of water-solids flow in the conduit and arranged, in correlation with the interior wall of the conduit, to receive mechanical impacts by solid minerals in water-solids flow moving forwardly in the conduit and to provide passage space for continual flow of water and solids through the conduit;

(c) an electromechanical impact sensor mechanically associated for generating a voltage pulse in response to a mechanical impact onto the target; and (d) electric circuit means for receiving electric signals from the sensor and providing, in response thereto, an output signal informative of the quantity of solid minerals that impact upon the target at a chosen moment or during a preselected time interval.

6. Apparatus as set forth in claim 5 wherein the impact sensor includes an inertial mass accelerometer.

7. Apparatus as set forth in claim 5 wherein the impact sensor includes a piezoelectric crystal.

8. Apparatus as set forth in claim 5 wherein the target comprises a plurality of rods spaced apart from each other and each rod has a piezoelectric crystal sensor attached individually to the rod.

9. A process for determining the amount of solid articles in a fluid-solids mixture of fluid with solid articles that are individually characterized by a weight at least equal to a preselected weight present therein comprising:

(a) establishing and continuously maintaining a forwardly directed flowing stream of the fluid-solids mixture within the confines of a conduit;

(b) intercepting, within said conduit, a portion of the flowing stream with a target surface that faces transversely across the intercepted portion to thereby result in impacts upon the target by solid articles moving parallel to the forward direction of the stream and meanwhile maintaining the flow of the fluid-solids mixture, including articles bouncing off the target, through the conduit;

(c) electromechanically generating voltage pulse signal responses from impacts on the target, said responses being pulse signals individually representative of individual impacts by solid articles having at least the preselected weight; and (d) electrically processing said pulse signals to provide, optionally with mechanical aid, a readable display informative of the amount of solid articles flowing in the established flow of the fluid-solids mixture.

10. A process as set forth in claim 9 wherein the pulse signals are processed to provide a plurality of readable displays comprising a digital display informative of the number of articles that impact onto the target surface and an analogue display informative of the weight of articles that impact onto the target surface.

* * * * *